United States Patent [19]

Tucker

[11] Patent Number: 4,612,582
[45] Date of Patent: Sep. 16, 1986

[54] LIQUID COOLED CATHODE RAY TUBE ASSEMBLY FOR VIDEO IMAGE PROJECTION SYSTEMS

[75] Inventor: Arthur R. Tucker, Titusville, Fla.

[73] Assignee: Electronic Systems Products Inc., Titusville, Fla.

[21] Appl. No.: 627,034

[22] Filed: Jul. 2, 1984

[51] Int. Cl.⁴ .............................................. H04N 5/74
[52] U.S. Cl. ..................................... 358/237; 358/242
[58] Field of Search ................. 358/60, 64, 237, 242, 358/245, 254; 313/22, 25

[56] References Cited

U.S. PATENT DOCUMENTS

| | | |
|---|---|---|
| 1,143,663 | 6/1915 | Straubel . |
| 1,209,753 | 10/1916 | Patterson . |
| 1,277,040 | 8/1918 | Brewster . |
| 1,357,621 | 11/1920 | Proszynski . |
| 2,241,968 | 3/1941 | Suits .............................. 176/122 |
| 2,338,388 | 1/1944 | Whitman ........................... 250/48 |
| 3,105,916 | 10/1963 | Marker ............................. 313/33 |
| 3,306,975 | 2/1967 | Donnay .............................. 178/7.2 |
| 4,031,553 | 6/1977 | Sumiyoshi ......................... 358/247 |
| 4,151,554 | 4/1979 | Tucker ............................... 358/64 |
| 4,405,949 | 9/1983 | Hockenbrock .................... 358/242 |
| 4,409,544 | 10/1983 | Loda ................................. 313/34 |
| 4,529,905 | 7/1985 | Ohkoshi ........................... 358/245 |

Primary Examiner—Tommy P. Chin
Attorney, Agent, or Firm—Duckworth, Allen & Dyer

[57] ABSTRACT

A video image projection system uses an improved cathode ray tube assembly incorporating a projection cathode ray tube within a housing with a light transmissive heat transfer fluid contained within the housing and surrounding the exterior surface of a portion of the cathode ray tube to transfer heat between the cathode ray tube faceplate and a portion of the cathode ray tube bowl. The heat transfer fluid may also cooperate with a novel faceplate structure on the cathode ray tube to store capacitatively an electrical charge to increase the dynamic range of brightness of the projected image.

12 Claims, 4 Drawing Figures

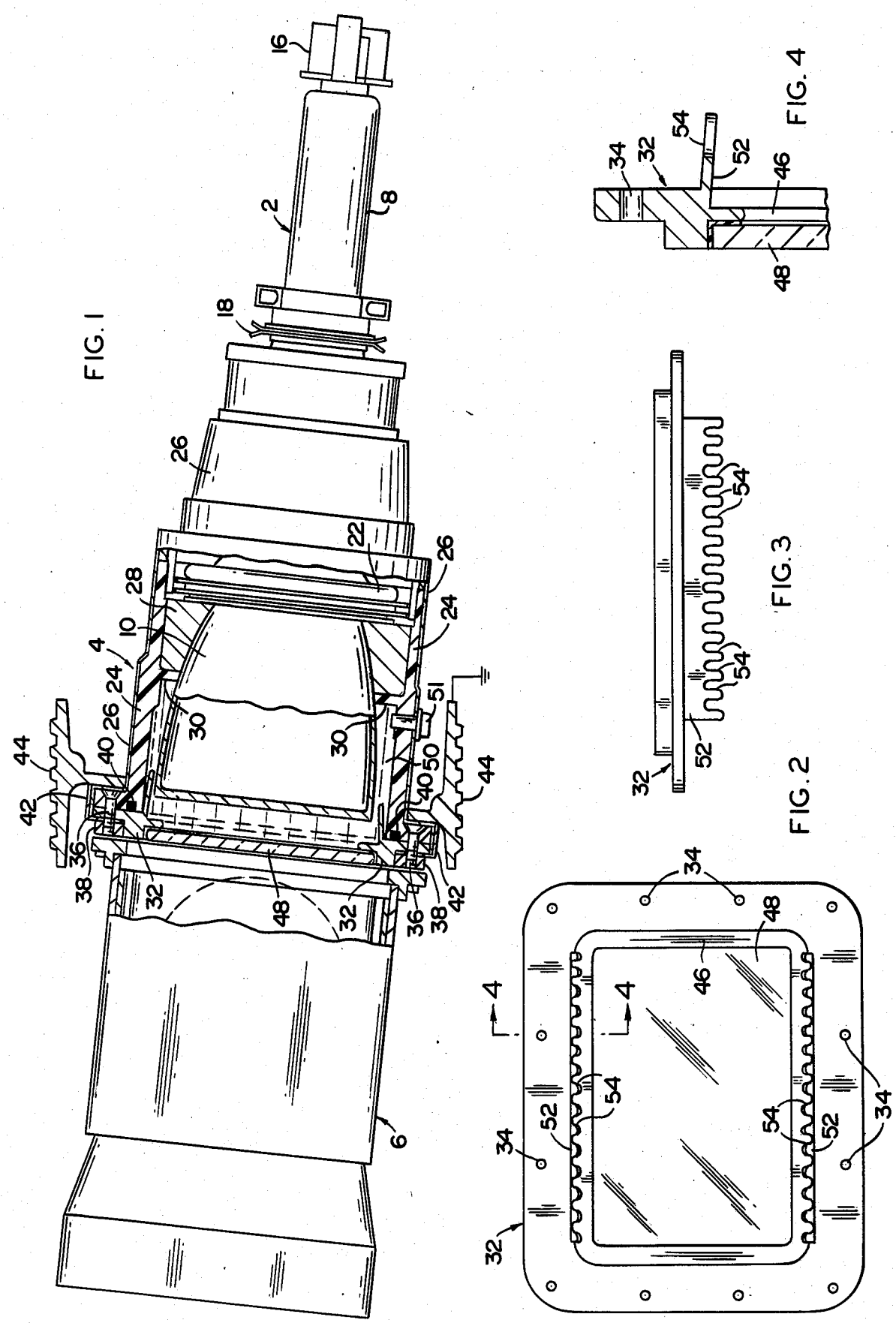

LIQUID COOLED CATHODE RAY TUBE ASSEMBLY FOR VIDEO IMAGE PROJECTION SYSTEMS

BACKGROUND OF THE INVENTION

This invention relates generally to the field of video image projection systems. More particularly, the invention relates to such projection systems utilizing high power cathode ray tubes in which substantial energy is applied by the cathode ray tube to its faceplate.

Video image projection systems have become increasingly popular, both in relatively low power units for use in home applications with larage-screen televisions and in high power applications for use in theater applications and the like. In this latter, higher power type the ultimate performance is frequently limited by the power that may be utilized by the cathode ray tube. Such limitations have frequently manifested themselves in several performance limitations. The application of very high power levels to the phosphors on the interior side of the faceplate of the cathode ray tube may, in conventional equipment, cause excessive heating of that faceplate, thus creating significant thermal stresses between the heated faceplate and the relatively unheated bowl of the tube that joins to the faceplate. Such thermal stresses have manifested themselves in cracking of the faceplates and bowls due to these thermal stresses, thus reducing the useful life of the cathode ray tubes themselves. Additionally, the problems have also manifested themselves in the blurring, or "blooming", of the image when extremely high power levels are applied by the power supply to the electron gun used in the cathode ray tube. To reduce the problem caused by the thermal stresses, it has become a conventional practice to provide liquid cooling to the faceplate of the cathode ray tubes, as described in my previous U.S. Pat. No. 4,151,554. However, even this provision of liquid cooling was insufficient to eliminate the problem of excessive thermal stresses, so that the cathode ray tubes utilized in such application have frequently failed prematurely as a result of cracking of the faceplate.

I have discovered that one of the primary problems with the prior liquid cooling arrangement for this apparatus has related to the still substantial temperature differential between the heated faceplate and the unheated adjacent bowl portion of the tube.

SUMMARY OF THE INVENTION

To overcome the above noted disadvantages of the prior art structures, it is an object of the present invention to provide a cathode ray tube assembly in a video image projection system and a method that reduces the thermal stresses on the cathode ray tube. It is a further object of this invention to provide such method and apparatus utilizing a fluid heat transfer medium contacting the faceplate of the cathode ray tube.

To achieve these and other objects that will become apparent to those skilled in the art, the present invention provides, in a video image projection system, a method of and apparatus for reducing stress in an improved cathode ray tube assembly that comprises a housing having an interior cavity with a window that is substantially transparent optically for transmission of a projected video image therethrough, a projection cathode ray tube mounted to the housing with its faceplate and bowl extending within the housing interior cavity with the faceplate proximal the housing window, a fluid sealing arrangement extending between a portion of the surface of the housing interior cavity and a rearward portion of the tube to form a fluid type seal between the housing interior cavity surface and the tube bowl rearward portion to define a forward cavity portion between the sealing structure, the interior cavity wall portion and the tube faceplate and forward bowl portions, and light transmissive heat transfer fluid contained within that forward cavity portion and surrounding the exterior surface of the tube faceplate and forward bowl portion, whereby the fluid will transfer heat between the tube faceplate and the tube forward bowl portion. In a preferred embodiment of the apparatus of this invention the cathode ray tube bowl forward portion comprises the portion of the tube bowl extending at least one-third of the distance between the tube faceplate and the joint between the tube bowl and the tube neck. Also in a preferred embodiment the cathode ray tube is provided with a conductive coating on the interior surface of the faceplate, and the heat transfer fluid is at least partially conductive and electrically connected to ground, whereby the faceplate of the tube functions as a capacitor to store a portion of the charge imparted thereto by the electron gun of the tube, to increase the dynamic range of brightness of the image formed on the faceplate.

BRIEF DESCRIPTION OF THE DRAWING

A particularly preferred embodiment of the method and apparatus of this invention will be described in detail in connection with the drawings in which:

FIG. 1 is a side elevational view, partially in section, of the improved cathode ray tube assembly of the present invention;

FIG. 2 is a rear elevation of the convection promoting device incorporated in the preferred embodiment of FIG. 1;

FIG. 3 is a top view of the convection promoting device of FIG. 2;

FIG. 4 is a fragmentary sectional view of the convection promoting device of FIG. 2 taken along line 4—4.

DESCRIPTION OF PREFERRED EMBODIMENT

A particularly preferred embodiment of the cathode ray tube assembly of the present invention is illustrated in the side elevational view, partially in section, of FIG. 1. The basic components of this apparatus are the cathode ray tube, generally indicated by reference numeral 2, and a housing for the tube, generally indicated by reference numeral 4. A suitable projection and focusing lens system, generally indicated by reference numeral 6 is also provided but may be of conventional structure and does not form a part of the present invention.

The cathode ray tube 2 comprises, generally a neck portion 8 housing an electron gun (not shown) in the conventional manner, with that neck being joined to the rearward portion of the tube bowl 10, to the forward extremity of which bowl is attached the cathode ray tube faceplate 12. These various components of the cathode ray tube 2 are generally conventional in nature. However, whereas conventional such cathode ray tube faceplates frequently have a thickness of about 0.25 inches to 0.4 inches with a convex curvature to resist the differential pressure of atmosphere on the exterior surface and the evacuated volume on the interior, cathode ray tubes used with the apparatus of present invention may suitably have a thin and flat faceplate, which may suitably be as thin as 0.16 inches, as a result of the features of the present invention that will be described below. Additionally, the interior surface (indicated by reference numeral 14) of the faceplate 12 is provided with a coating of deposited aluminum, as well as the conventional phosphors, for purposes to be described below. To the electron gun within the tube neck 8 is attached a conventional connector 16 through which signals are fed from the supporting video system in the conventional manner.

Surrounding portions of the tube neck are conventional components such as astigmatic correction magnets 18, secondary deflection yokes 20 and primary deflection yoke assembly 22, which extend around both the forward portions of the neck 8 and rearward portions of the bowl 10. These deflection yokes preferably are enclosed within portions of the housing 4 that surround the relevant parts of the cathode ray tube 2.

The housing 4 suitably comprises a tube retainer and yoke retainer 24 that may conveniently be formed by injection molding a conventional synthetic resin, or plastic. For x-ray shielding of such plastic parts a lead coating or sheathing 26 may be provided.

In this preferred embodiment the rearward portion of the cathode ray tube bowl 10 preferably is mounted to the plastic housing portion 24 by "potting" with a suitable material, such as RTV silicone rubber 28 sealingly engaging both the tube bowl 10 and interior portions of the housing. This potting material 28 thus forms a fluid seal extending between the housing interior and the rearward portion of the tube bowl as shown in FIG. 1. Thus, the cathode ray tube 2 is supported with its central axis generally horizontal within the housing by the potting material 28 and the engagement of the tube bowl with the lip 30 of the housing.

Fastened to the forwardmost (leftward in FIG. 1) surface of the plastic housing member 24 is an x-ray shield 32, which is illustrated in greater detail in the views of FIGS. 2, 3, and 4, and which may suitably be formed of a zinc alloy casting. While this x-ray shield 32, as well as the housing 4, is shown in this embodiment as being generally rectangular to correspond to the rectangular faceplate of the cathode ray tube 2, it is to be understood that it may equally well be of circular configuration for use with a circular cathode ray tube, or any other convenient configuration.

The x-ray shield 32 is provided with a plurality of holes 34 through which may be received fasteners 36, which may, in turn, be threaded into retaining ring 38 for clamping the x-ray shield 32 to the forward portion of the housing 4. To provide for a fluid-tight seal between the shield 32 and the tube retaining housing 24 there is provided an O-ring seal 40, as shown. Additionally, a heat transfer cap 42, which may conveniently be formed of a material of high heat conductivity, such as aluminum, may extend over radially outer flange portions of the shield 32 and housing molding 24, suitably being clamped between the retaining ring 28 and the shield 32 to receive and conduct heat therefrom, for purposes to be described below. Additionally, a heat sink 44, suitably formed of an aluminum extrusion may also be provided, bearing against the heat transfer cap 42 to conduct heat therefrom.

As shown in FIGS. 1, 2, and 4, the x-ray shield 32 is provided with a recessed lip 46 defining a central aperture therethrough. Against this recessed lip is bonded a window 48, suitably formed of a lead glass that may function both as an x-ray shield and as a window that is substantially transparent optically for transmission of images from the cathode ray tube therethrough.

By this construction the shield 32 with its window 48 thus form the forward wall of an interior cavity of the housing 4 within which extends the forward portion of the bowl 10 and the faceplate 12 of the cathode ray tube 2. Within this forward cavity portion is provided a fluid 50, which preferably comprises a liquid mixture of approximately fifty percent glycerine, thirty percent triethylene glycol, about twenty percent distilled water and a trace of salt, such as sodium chloride, although other mixtures may also function satisfactorily. This mixture serves as a heat transfer fluid as described below and also may provide for enhanced dynamic range of brightness for the image on the faceplate of the cathode ray tube, also as described below. The fluid may be introduced into the cavity through the aperture into which is shown inserted a filler plug 51, which may be of brass of similar material and provided with a fluid-tight seal. In this preferred embodiment the fluid 50 is introduced and maintained within that cavity at a pressure of less than one atmosphere, preferably about one-half atmosphere, thus to reduce the stress imposed upon the faceplate 12 of the cathode ray tube by virtue of the difference of pressure between the exterior surface of that faceplate 12 and the interior surface, which is within the evacuated interior portion of the cathode ray tube.

As shown in all the figures, but most clearly in FIGS. 2, 3, and 4, the x-ray shield 32 is provided adjacent the upper and lower portions of the central aperture with generally horizontally extending portions 52 projecting outwardly from the surface of the shield 32 that engages the forward portion of the housing molding 24. This portion 52 is configured generally as an outwardly projecting lip with a plurality of "fingers" 54 that extend above and below and are spaced from the tube faceplate 12 and the portion of the tube bowl 10 adjacent the faceplate 12.

The manner in which the structure serves to reduce stresses on the cathode ray tube may now be seen. When this apparatus is in operation the cathode ray tube is operated at relatively high power in order to obtain the image brightness necessary for use in such a projection video system. This high power applied to the phosphors deposited on the inside of the faceplate 12 result in significant heating of that faceplate 12. In contrast, there is no such direct impingement of the charged electrons on the tube bowl portions 10 that join immediately to the faceplate at the forward extremity of that bowl portion 10. Thus, there may be a substantial difference in temperature between the faceplate 12 and the adjacent portions of the bowl 10, thus creating significant thermal stresses which, in prior units, have resulted in frequent cracking of the faceplate. For units operated at high power levels this has resulted in such failure rates as high as twenty-seven percent of the cathode ray tubes so used.

However, in this present invention the heat transfer fluid 50 intimately contacting the faceplate 12 transfers a substantial portion of the heat therefrom by conduction and convection. Convective forces within this fluid cause the heated fluid 50 to rise and move upwardly across the tube faceplate 12. Adjacent the upper extremity of the faceplate 12 is positioned the upper convection promoting member 52 of the x-ray shield 32, preferably defining a relatively narrow passage between that member 52 and the upper exterior surface of the forward portions of the cathode ray tube bowl 10. This causes the heated fluid flowing under the convective forces to be directed to the rear of that cavity, thus heating the remainder of the fluid in the upper portions of that cavity and thereby serving to transfer a portion of the heat to the forward portions of the tube bowl 10. Such upperward convective flow across the faceplate of the tube will thus force the fluid moving rearwardly along the top of the tube bowl then to flow downwardly along the sides of the tube bowl to the lowermost portions of the cavity as the heat is transferred to the tube bowl 10. Continued convection will thus cause fluid from that lower portion of the chamber to move through the passage between the lower exterior surface of the forward bowl portion 10 of the tube and the lower convection promoting member 52 and thus upperwardly across the faceplate again. Thus, the heated fluid will serve to transfer a substantial portion of the heat from the faceplate 12 to the forward portion of the cathode ray tube bowl 10, so that the warming of those bowl portions will serve to reduce the thermal stresses between the faceplate and the bowl.

In this invention it is preferred that the portion of the cathode ray tube bowl within the heated and fluid filled chamber comprise the portion of the tube bowl extending at least one-third of the distance between the tube faceplate and the joint between the tube bowl 10 and the tube neck 8. It may be desirable to have even more of the tube bowl, such as that portion extending approximately halfway between the tube faceplate and the joint between the neck and the bowl.

By providing this convective heat transfer arrangement with the liquid cooling and heat transfer chamber extending back around the bowl of the tube and providing within the cavity the light transmissive heat transfer fluid surrounding the faceplate and that portion of the tube bowl the thermal stresses may be substantially reduced. Additionally, the mechanical connection between the x-ray shield 32, the heat transfer cap 42 and the heat sink 44 serves to remove heat from the cathode ray tube assembly to the outside atmosphere. Furthermore, the thinner faceplate 12 made usable by this invention may also experience lower levels of thermal stress than would the thicker faceplates of conventional structures.

This heat transfer fluid 50 is preferably made at least partially electrically conductive, such as by the inclusion of small amounts of sodium chloride. Additionally, by virtue of the intimate contact with the x-ray shield 32 that engages the heat transfer cap 42 and the heat sink 44, which is shown as connected to ground, the fluid 50 itself is effectively connected to ground. Thus, the combination of the conductive fluid 50 engaging the exterior surface of the cathode ray tube faceplate 12, the dielectric glass faceplate 12 itself and the conductive aluminum coating 14 deposited on the interior surface of that faceplate permits the faceplate to function as a capacitor in response to high voltage electrical charges imparted thereto by the electron gun utilized to form the images on the phosphors also coating the interior of the faceplate.

By virtue of this capacitive structure the faceplate may store at least a portion of the charge applied thereto by the electron gun as well as forming the image on the phosphors. This capacitive structure may then serve to store the charge that serves as the peak energy required by the cathode ray tube for imaging at high dynamic ranges of brightness. In this manner the instantaneous power required for a bright image may be drawn from that stored on the tube faceplate, with the external power supply connected through connector 16 to the electron gun providing the lower, average level of power required. This arrangement thus provides for high intensity images without the "blooming" that conventionally occurs when high peak power images are attempted by applying such high peak power from the power supply and electron gun directly to the phosphors. It has been found that this arrangement permits utilization of peak currents on the faceplate of approximately 30 milliamps, as contrasted with the limitations of one to two milliamps available through conventional arrangements utilizing only the power supply and no stored energy. In this manner the dynamic range of the brightness of the image formed on the faceplate may be significantly increased without the "blooming" previously experienced.

The capability for increased dynamic range and enhanced heat transfer thus provided for significantly increased usable projection power of the video projection system. It has been found that a projection system utilizing the improvements of this invention may be operated satisfactory at power levels of nine to ten watts per square inch on the cathode ray tube faceplate, as contrasted with the practical limitations of three to four watts per square inch experienced by conventional projection systems.

While the foregoing describes a video image projection system in the context of a single cathode ray tube, it is to be understood that the structure, features and methods of operation are equally applicable and suitable for use with a plurality of similar devices, such as the three cathode ray tubes conventionally utilized in color video image projecting systems. Further, because numerous variations and modifications of the structure, methods and features of this invention, all within the scope of the invention disclosed, will readily occur to those skilled in the art, the foregoing description is to be considered illustrative only of the principles of the invention and not limitative thereof. The scope of this invention is thus to be defined solely by the claims appended hereto.

What is claimed is:

1. In video image projection system an improved cathode ray tube assembly comprising
 a housing having an interior cavity defined by wall portions and having a window that is substantially transparent optically for transmission of a projected video image therethrough;
 projection cathode ray tube means mounted to said housing, said cathode ray tube means having a tube faceplate and bowl portion extending within said housing interior cavity, with said tube faceplate proximal said window;
 fluid sealing means extending between a portion of the surface of said housing interior cavity and a rearward portion of said tube bowl distal said faceplate to form a fluid-tight seal between said housing interior cavity surface and said tube bowl rearward portion, whereby exists a forward cavity portion between said sealing means, the interior cavity wall portions and said tube faceplate and forward bowl portion proximal thereto;
 light transmissive heat transfer fluid which is at least partially conductive and electrically connected to ground, said heat transfer fluid being contained within said forward cavity portion and surrounding the exterior surface of said tube faceplate and forward bowl portion, whereby the fluid will transfer heat between the tube faceplate and the tube forward bowl portion; and a conductive coating on the interior surface of said faceplate whereby the faceplate of the tube functions as a capacitor in response to the electrical charge imparted thereto by the electron gun of the tube.

2. The cathode ray tube assembly of claim 1 wherein said cathode ray tube further includes a tube neck joined to said tube bowl distal said faceplate, and wherein said tube bowl forward portion comprises the portion of said tube bowl extending at least one-third of the distance between said tube faceplate and the joint between said tube bowl and said tube neck.

3. The cathode ray tube assembly of claim 1 wherein said heat transfer fluid comprises a mixture of glycerin, ethyl alcohol, water and salt.

4. The cathode ray tube assembly of claim 1 wherein said heat transfer fluid is maintained within said housing forward cavity portion at a pressure of less than one atmosphere.

5. In video image projection system an improved cathode ray tube assembly comprising
   a housing having an interior cavity defined by wall portions and having a window that is substantially transparent optically for transmission of a projected video image therethrough;
   projection cathode ray tube means mounted to said housing with the central axis of the cathode ray tube means generally horizontal, said cathode ray tube means having a tube faceplate an bowl portion extending within said housing interior cavity, with said tube faceplate proximal said window;
   fluid sealing means extending between a portion of the surface of said housing interior cavity and a rearward portion of said tube bowl distal said faceplate to form a fluid-tight seal between said housing interior cavity surface and said tube bowl rearward portion, whereby exists a forward cavity portion between said sealing means the interior cavity wall portions and said tube faceplate and forward bowl portion proximal thereto;
   light transmissive heat transfer fluid contained within said forward cavity portion and surrounding the exterior surface of said tube faceplate and forward bowl portion, whereby the fluid will transfer heat between the tube faceplate and the tube forward bowl portion; and
   convection promoting means mounted within said forward cavity portion, said convection promoting means including a lower member extending below and spaced from said faceplate and said tube bowl portion adjacent thereto and an upper member extending above and spaced from said faceplate and said tube bowl portion adjacent thereto, whereby at least a portion of the heat transfer fluid moving upwardly across the tube faceplate under the influence of heating from the faceplate will flow between the tube bowl and the lower member, along the faceplate and then between the tube bowl and the upper member.

6. The cathode ray tube assembly of claim 5 wherein said convection promoting means comprises a thermally conductive metallic structure thermally connected to heat sink means external to said cavity for removal from said cavity of a portion of the heat carried by said heat transfer fluid.

7. In a video image projection system an improved cathode ray tube assembly, comprising
   a projection cathode ray tube having a faceplate of electrically insulating glass and having an electrically conductive coating on the interior surface of said faceplate;
   a housing having an internal cavity receiving therewithin the exterior surface of at least said faceplate of said cathode ray tube and having an optically transparent window opposite said faceplate for transmission of a projected video image and
   a light transmissive liquid that is at least partially electrically conductive and connected to ground provided within said internal cavity and in contact with said faceplate exterior surface, whereby the combination of the faceplate, its conductive interior coating and the light transmissive liquid function as a capacitor to provide a capacitance in response to a high voltage electrical charge imparted thereto by the electron gun of the cathode ray tube to store at least a portion of that charge for use with electrical charges subsequentially applied thereto by the electron gun in its operation to increase the dynamic range of the brightness of the projected video image thereby formed on the faceplate.

8. The cathode ray tube assembly of claim 7 wherein said light transmissive liquid comprises a mixture of glycerin, ethyl alcohol, water and salt.

9. In an image projection system using a cathode ray tube having a faceplate and adjacent bowl, a method of reducing stress in the faceplate and adjacent bowl, comprising the steps of
   enclosing said cathode ray tube faceplate and at least a first portion of said bowl adjacent said faceplate within a housing cavity having a substantially transparent window for transmission of a projected image;
   mounting convection promoting means within said housing cavity, said convection promoting means including a lower member extending below and spaced from said faceplate and said bowl adjacent thereto and an upper member extending above and spaced from said faceplate and said bowl adjacent thereto;
   providing within said cavity a quantity of light transmissive heat transfer liquid sufficient to substantially surround said cathode ray tube faceplate and said bowl first portion within said cavity, whereby at least a portion of the heat transfer liquid moving upwardly across said faceplate under the influence of heating from said faceplate will flow between said bowl and the lower member, along the faceplate and then between the tube bowl and the upper member.

10. The method of claim 9 wherein said bowl joined at one end to said faceplate is joined at its other end to a neck portion and wherein said bowl first portion comprises at least the portion of said bowl adjacent to said faceplate extending at least one third the distance from said faceplate to said neck portion, whereby the heat carried by the liquid may be distributed around both said faceplate and said bowl first portion.

11. The method of claim 9 further comprising the steps of removing heat from said cavity by providing a metallic heat conductor within said liquid in said cavity and extending adjacent the upper and lower portions of said cathode ray tube and connected to heat sink means, whereby at least a portion of the heat convectively transferred from the tube faceplate by the liquid is taken by the metallic heat conductor to the heat sink for dissipation.

12. The method of claim 9 further comprising maintaining the pressure of said heat transfer liquid at less than one atmosphere, whereby the stress exerted on faceplate faceplate by the liquid is reduced.

* * * * *

UNITED STATES PATENT AND TRADEMARK OFFICE
CERTIFICATE OF CORRECTION

PATENT NO. : 4,612,582

DATED : September 16, 1986

INVENTOR(S) : Harvey F. George et al.

It is certified that error appears in the above-identified patent and that said Letters Patent is hereby corrected as shown below:

On The Title Page insert

--[22] PCT Filed: June 3, 1983

[86] PCT No: US83/00860

371 Date: Oct. 31, 1984

102(e) Date: Oct. 31, 1984

[87] PCT Pub. No.: WO84/05006

PCT Pub. Date: Dec. 20, 1984 --.

Signed and Sealed this

Thirteenth Day of February, 1990

*Attest:*

JEFFREY M. SAMUELS

*Attesting Officer*     *Acting Commissioner of Patents and Trademarks*